May 11, 1965     I. RUBENSTEIN     3,182,611

APPARATUS FOR MAKING AND PACKAGING ICE CREAM SANDWICHES

Filed April 8, 1963     4 Sheets-Sheet 1

IRVING RUBENSTEIN
*INVENTOR.*

BY *Daniel H. Bobis*
*Atty*

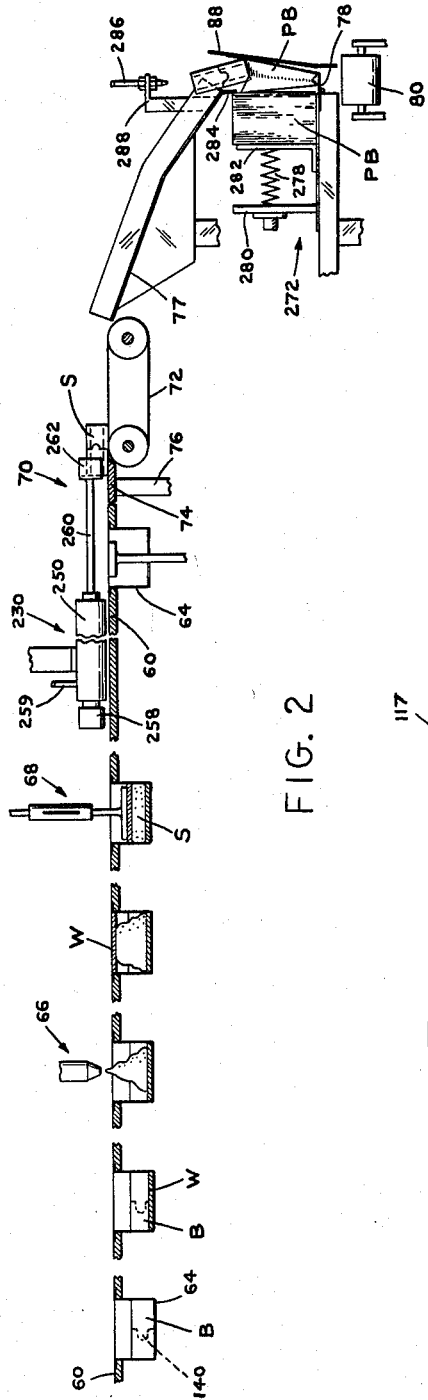
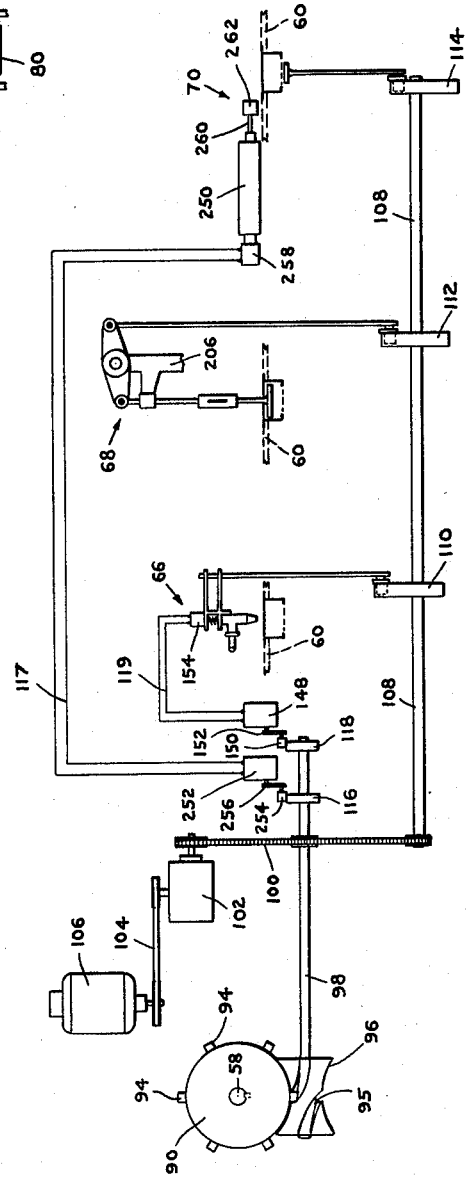
FIG. 2
FIG. 3
IRVING RUBENSTEIN
INVENTOR.
BY

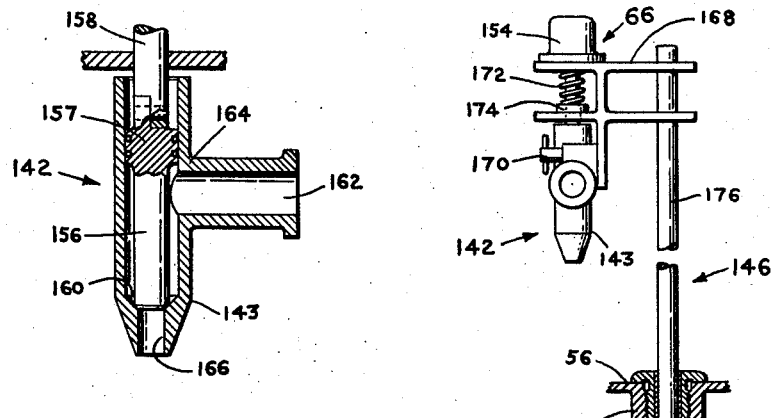
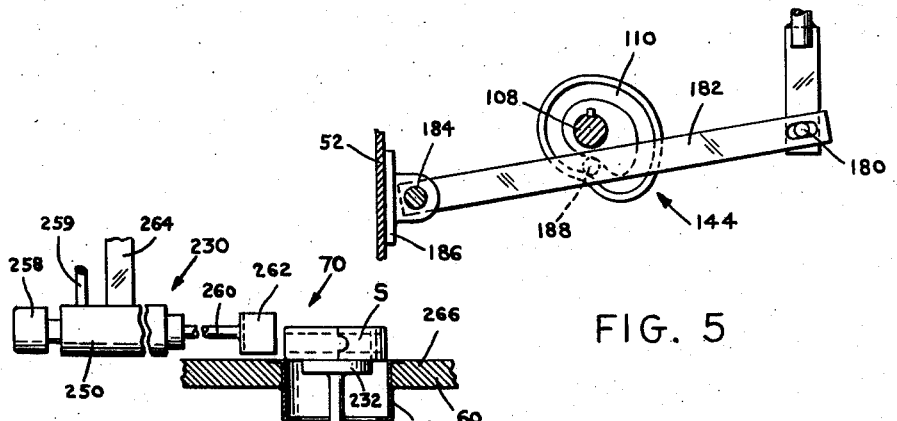
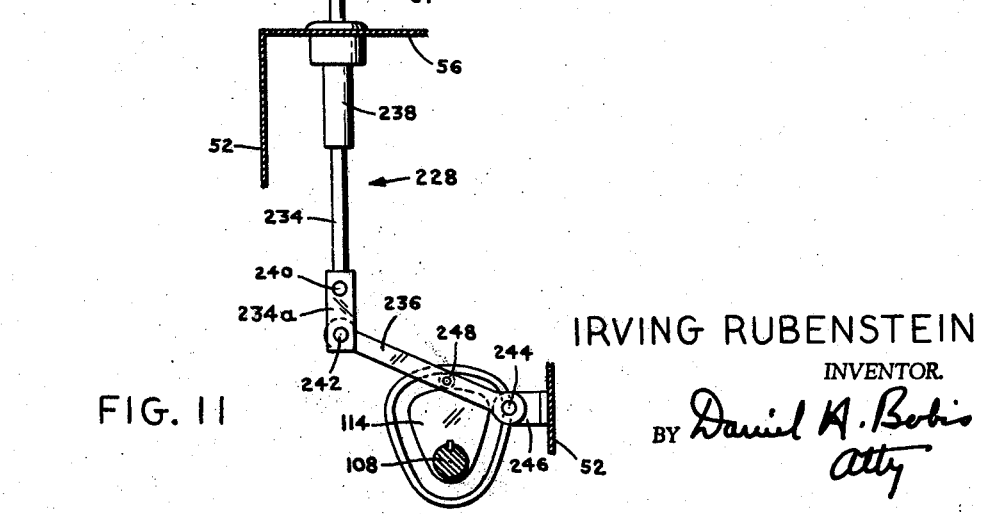

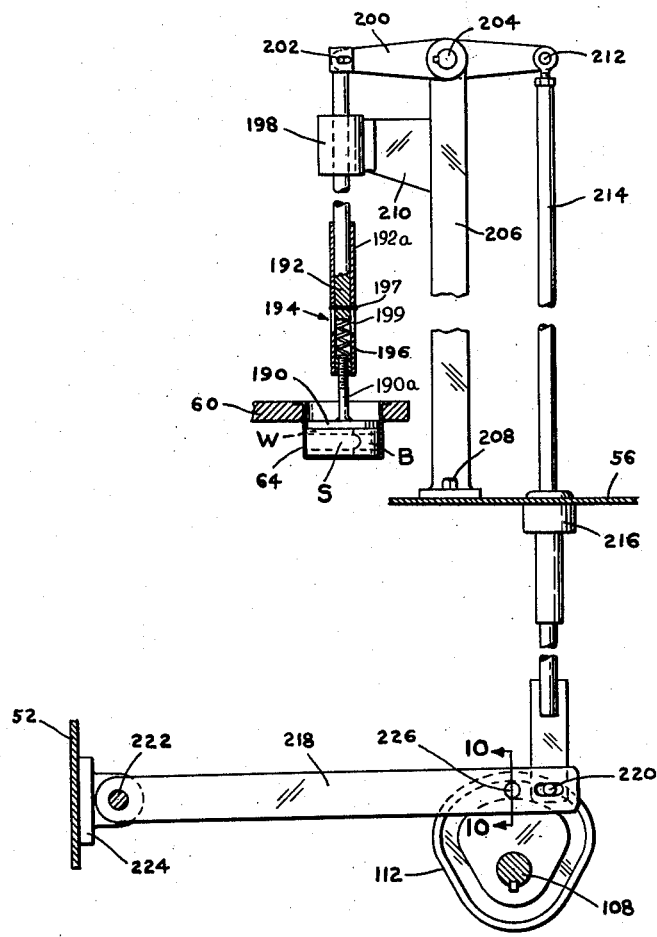

United States Patent Office 3,182,611
Patented May 11, 1965

3,182,611
APPARATUS FOR MAKING AND PACKAGING
ICE CREAM SANDWICHES
Irving Rubenstein, 670 Peeton Ave., Staten Island, N.Y.
Filed Apr. 8, 1963, Ser. No. 271,147
1 Claim. (Cl. 107—1)

This invention relates generally to a method and apparatus for making and packaging an edible article. More particularly the invention relates to a method and apparatus for making and packaging ice cream sandwiches.

Heretofore the making and packaging of ice cream sandwiches have required frequent cleaning of the machinery used thus adding to the already high cost thereof. In addition the process was slow and the product non-uniform.

An object of the present invention is to overcome these prior art difficulties and to provide an improved method and apparatus for making and packaging uniformly sized ice cream sandwiches, which method and apparatus are simple, efficient, reliable and uniform; which require infrequent cleaning of the machinery; which use an intermittently operated machine having improved inserts in the turret thereof; which automatically eject the sandwich and package it.

Other objects and advantages will be apparent from the following description of one embodiment of the invention and the novel features will be particularly pointed out hereinafter in the claim.

In the drawings:

FIGURE 2 is a schematic view of the successive steps in the improved method of making and packaging the ice cream sandwich.

FIGURE 3 is a diagrammatic view of the various driving and operating mechanisms of the machine.

FIGURE 5 is a side elevation, partly in section, of the ice cream unit.

FIGURE 6 is a sectional view of the valve unit of the ice cream unit.

FIGURE 7 is a side elevation, partly in section of the compactor unit.

FIGURE 8 is a plan view of the compactor unit.

FIGURE 9 is an elevation view of the yieldable rod.

FIGURE 10 is a sectional view of the close track cam follower roller.

FIGURE 11 is a side elevation, partly in section, of the ejector unit.

Figure 1:
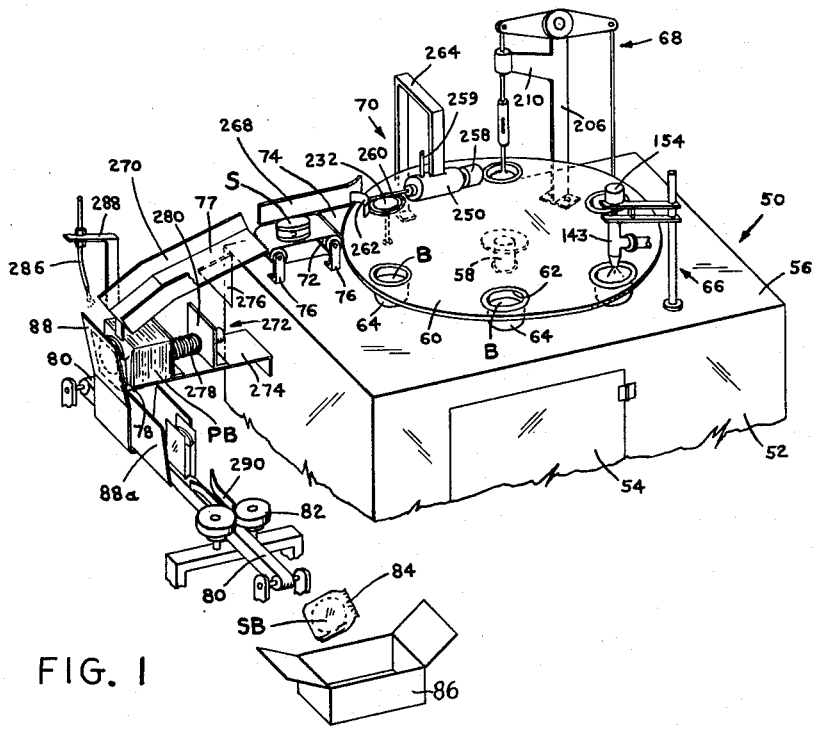
FIGURE 1 is a perspective view of the improved apparatus embodying the present invention.

In the embodiment of the invention illustrated in the drawings FIGURE 1 shows a machine 50 having a housing 52 in which there is an access door 54 to allow access to the operating mechanism therein. Housing 52 is of sturdy construction and can support the necessary operating mechanism both internally and externally thereof. Top surface 56 of housing 52 has shaft 58 extending therethrough to support and intermittently rotate turret 60 as more fully described hereinafter.

Turret 60 has a plurality of pockets 62 into each of which is disposed a socket 64. Successively disposed about the turret 60 in superposition to pockets 62 are ice cream unit 66, compactor unit 68 and ejector unit 70 with a pocket 62 being left open between ice cream unit 66 and compactor unit 68 for the addition of an optional automatic feed (not shown) of the top wafer W of the sandwich; further two pockets 62 are left open between ejector unit 70 and ice cream unit 66 for the addition of the protective paper band B and bottom wafer W as the wafer and paper band will be manually loaded.

Ejector unit 70 will deliver ice cream sandwich S to a conveyor belt 72 after crossing a triangular shaped apron 74 therewith. Turret 60, conveyor belt 72 and apron 74 all lie in the same horizontal plane with belt 72 and apron 74 suitably supported by brackets 76 connected to top surface 56. From conveyor belt 72 the sandwich S slides down chute 77 into a wax paper bag PB which being on a hinged flap 78 will drop onto conveyor belt 80 with the open end up and thereafter pass through heated rollers 82 which cause the top sides of the wax paper bag PB adhere to each other as shown generally at 84. Conveyor 80 will then deliver the sealed bag SB to a storage or delivery box 86 from which point it can be manually stacked therein and stored or delivered while being kept under proper temperature conditions.

The method of making the ice cream sandwich may proceed, as shown schematically in FIGURE 2, wherein the protective paper band B and then the bottom wafer W are disposed into socket 64. Turret 60 will be successively positioned by being intermittently rotated throughout the steps of this operation and such step-by-step rotation as will be hereinafter described will be understood to be taking place.

The next step will be the addition of the ice cream by ice cream charging means or ice cream unit 66, followed by disposing top wafer W into socket 64. Thereafter the sandwich S is gently squeezed by compactor unit 68 and then it is removed from socket 64 by ejector unit 70 from which it is pushed across apron 74 onto conveyor belt 72. Conveyor belt 72 delivers sandwich S to chute 77 from which it slides into an open bag PB with retaining wall 88 keeping the now sandwich S filled bag PB in an upright position when the weight thereof causes the lightly sprung flap 78 to operate and drop bag PB onto conveyor belt 80.

The power means of operating mechanism of machine 50 is disposed within housing 52 but for clarity is illustrated in FIGURE 3 diagrammatically. The mechanism for driving turret 60 consists of a typical intermittent drive which includes a driver disc 90 keyed to vertical shaft 58. Shaft 58 is suitably mounted in housing 52 by bearings (not shown) in the usual well known manner. Accordingly, when disc 90 is rotated intermittently, turret 60 will do likewise.

Since intermittent drives are well known in the art it need only be referred to briefly. In order to have disc 90 rotate intermittently it has a plurality of roller-type cam followers 94 about its circumference at predetermined uniformly, angularly spaced intervals. Followers 94 successively engage the groove 95 of barrel cam 96 which is so shaped that it will rotate disc 90 intermittently even though it is rotated continuously by shaft 98. Shaft 98 is sprocket driven by means of a chain and sprocket drive 100 which receives power from a gear box 102 which in turn is belt driven by belt 104 of motor 106. Furthermore, chain and sprocket drive 100 also continuously drive cam shaft 108.

Operatively associated with shaft 108 are a plurality of cams in axially spaced relation to each other. These cams are associated with the various units and are so constructed and disposed as to be in proper timed sequence for their particular function. There are present cam 110 associated with ice cream unit 66; cam 112 associated with compactor means unit 68; cam 114 associated with ejector means unit 70. In addition, shaft 98 has associated therewith switch actuating cam 116 which is used in conjunction with ejector unit 70 and switch actuating cam 118 which is used in conjunction with ice cream unit 66 as indicated by the connecting electric leads 117 and 119, the purpose of which will be described hereinafter.

Figure 4:
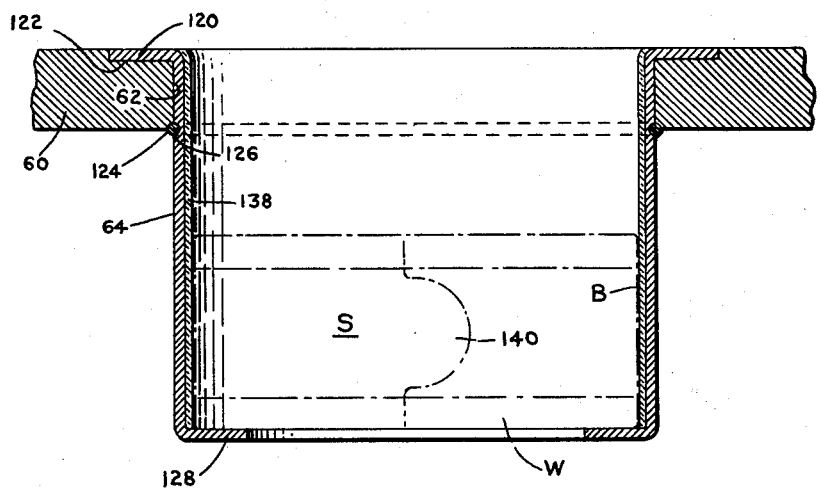
FIGURE 4 is a sectional view of the novel socket disposed in the pocket of the turret and showing the completed ice cream sandwich therein.

Each socket means 64, as shown in FIGURE 4, may include a cylindrical body which is fixedly disposed in pocket 62 by the cooperative action between outer or annular lip 120 of socket 64 which engages annular recess 122 of turret 60, and snap ring 124 being disposed in groove 126 which may be annular and said ring 124 engages the lower face of said turret. Thus, lip 120 prevents socket 64 from being displaced in a downward direction while snap ring 124 prevents any upward motion thereof. Inner rim 128 is formed at the bottom of socket 64 and is of sufficient length to prevent band B and edible wafer W from falling through socket 64. To facilitate removal of the ice cream sandwich when formed, socket 64 may have its inside coated with a Teflon lining 138.

Protective band B increases the period between service maintenance of the machine 50 by preventing unsanitary conditions within the socket 64 which would otherwise require constant cleaning thereof. Furthermore, band B can easily be removed by the consumer as it has a handy tear flap 140 which will cause it to be torn away from the ice cream sandwich. Band B can be formed of any suitable paper, waxed or plastic lined paper, certain plastic materials or any other suitable material.

Ice cream unit 66 is illustrated in FIGURES 1, 2, 3, 5 and 6 and consists of the valve unit 142, the cam unit 144 and the reciprocating unit 146. The valve unit 142 is controlled by the switch actuator cam 118, as shown in FIGURE 2, which activates switch 148 by means of finger 150 engaging switch lever 152 at the predetermined intervals. Switch 148 will activate solenoid 154 which raises the stem 156 of valve 143 that is connected to the lower end of core 158 of the solenoid which also rises. Thus, stem 156 is unseated from seat 160 and ice cream from a suitable source (not shown) entering inlet 162 of housing 164 will pass out port 166 onto wafer W. (See FIGURE 2.) Seal member 157 of stem 156 prevents the ice cream from leaving through the top of housing 164.

Valve unit 142 is suitably clamped to head 168 of reciprocating unit 146 by means of clamp 170. Valve 143 is normally closed by action of spring 172 urging collar 174 of core 158 in a downward direction thus forcing stem 156 to engage seat 160. When the solenoid is energized the force of spring 172 is overcome and valve 143 will be opened.

The reciprocating unit 146, as shown in FIGURE 5, has head 168 connected to the upper end of rod 176. Rod 176 is mounted for vertical movement in a bearing 178 disposed in top 56 of housing 52. Reciprocal motion of rod 176 and head 168 and attached valve unit 142 is obtained by connecting the lower end of rod 176 as by a pin and slot connection 180 to the outer end of an oscillating lever 182 of cam unit 144. The inner end of lever 182 is pivotally connected as at 184 to bracket 186 that is attached to a suitable wall of housing 52. Lever 182 is disposed transversely of and below cam shaft 108 and has connected thereto a cam follower roller 188 which is operatively disposed in the closed track of cam 110. The track of cam 110 is suitably shaped so as to cause valve unit 142 to be lowered, as shown in FIGURE 2, into socket 64 and simultaneously on its reaching its lowest point of descent the switch actuated cam 118 will cause switch 148 to activate solenoid 154 and thus open valve 143 and permit a predetermined quantity of ice cream to be deposited on wafer W. Valve 143 is closed as lever 182 raises valve unit 142 to its nonoperative position.

Compactor unit 68, as shown in FIGURES 2 and 7–10, will after the turret has rotated have under its compactor member 190 a non-compacted ice cream sandwich which it will proceed to compact by gently pressing against the top wafer W to urge it and the ice cream toward the bottom wafer W thus squeezing the ice cream against the band B and forming the finished ice cream sandwich S. To prevent the wafer W from breaking in case of slight maladjustment or too great a charge of ice cream, the compactor member 190 is connected to a yieldable rod 192 forming a part of yieldable linkage means. Rod 192, as shown in FIGURES 5, 7 and 9, has a telescoping flexible joint 194. Joint 194 consists of the yieldable connection of rod 192 to sleeve 192a by pin 197 which is adapted to slide in slot 199 of sleeve 192a on excessive force being exerted by rod 192. The other end of sleeve 192a threadedly engaged by stem 190a of compactor 190. A spring 196 is disposed within sleeve 192a and normally urges rod 192 in the upward direction so that the pin 197 engages the upper end of slot 199. However, on excessive force being exerted by rod 192, spring 196 will yield to allow rod 192 to move in a downward direction, guided by the movement of pin 197 in slot 199. On removal of the excessive force of rod 192, spring 196 will urge rod 192 to return to its original position with pin 197 once again resting against the upper end of slot 199. Rod 192 is slidably disposed in bearing 198 to insure its vertical position and is connected to lever 200 by pin and slot connection 202. Lever 200 is fulcrumed intermediate its ends by means of shaft 204 which is supported by bracket 206 which is suitably connected to housing top 56 as by threaded means 208. Bearing 198 is positioned by brace 210 which is fixedly connected to bracket 206. The end of lever 200 remote from rod 192, as shown in FIGURES 7 and 8, is pivotally connected at 212 to the upper end of actuating rod 214. Rod 214 is mounted for vertical movement in a bearing 216 disposed in housing top 56. Rod 214 is connected to and will move with lever 218 without binding in bearing 216 because it is connected to the outer end of lever 218 by a pin and slot connection 220. The inner end of lever 218 is pivotally connected as at 222 to bracket 224 which is in turn connected to a suitable wall of housing 52. Lever 218 is disposed transverse to and above cam shaft 108 and has connected thereto a cam follower roller 226 which is operatively disposed, as shown in FIGURE 10, in the closed track of cam 112. The track of cam 112 is suitably shaped so as to cause compactor 190 to be lowered into socket 64 and to urge the top wafer and enclosed ice cream to form an ice cream sandwich S of uniform depth.

The ejector means unit 70, as shown in FIGURES 1, 2, 3 and 11, includes a raising means assembly 228 and a pushing means assembly 230 which assemblies operate successively whereby the ice cream sandwich S is first removed from socket 64 by assembly 228 and then pushed across apron 74 onto conveyor belt 86 as described hereinbefore.

Raising assembly 228 has a round shaped plate 232 of smaller diameter so that on rod 234 to which it is connected being raised by lever 236, plate 232 will pass through inner rim 128 into socket 64 to raise sandwich S to a level equal to or slightly above the horizontal plane of turret 60. To insure the vertical alignment and stability of raising assembly 228 rod 234 is mounted in bearing 238 and has a section 234a thereof pivotally connected thereto as at 240 and to one end of lever 236 as at 242. The other end of lever 236 is pivotally connected as at 244 to bracket 246 which is in turn connected to a suitable wall of housing 52. Lever 236 is disposed transverse to and above cam shaft 108 and has connected thereto a cam follower roller 248 which is operatively disposed as shown in FIGURE 11 in the closed track of cam 114. The track of cam 114 is suitably shaped to provide for the top of plate 232 at its highest point to be substantially lying in the plane of the turret 60 and to remain in said plane during the removal operation of sandwich S by pushing assembly 230.

Pushing means assembly 230 includes a typical cylindrical air valve 250 which is solenoid operated. The switch actuator cam 116 (see FIGURE 3) is positioned to activate switch 252 by means of finger 254 engaging switch lever 256 at predetermined intervals that coincide with the plate 232 reaching its highest point of ascent Switch 252 will activate solenoid 258 which will cause air valve 250 to be opened to the compressed air from a suitable source (not shown) introduced from line 259 therein. Compressed air will act to urge a spring returned stem 260 having an arcuate pusher plate 262 connected thereto outwardly in the direction of conveyor belt 72, thus causing sandwich S to be pushed thereto as described hereinbefore. Pushing assembly 230 is disposed in a horizontal plane above turret 60 and suitably supported by frame 264 which in turn is connected to housing 52. Hence, arcuate pusher plate 262 has its lower end disposed slightly above the top surface 266 of turret 60 and will maintain this distance above surface 266 on moving responsive to the motion of stem 260.

Accordingly, as illustrated in FIGURES 1 and 2, sandwich S will be disposed on conveyor belt 72 and carried to chute 77 from which it will slide into bag PB. Guide walls 268 and 270 are associated with belt 72 and chute 77 respectively to prevent the sandwich S from falling off either component. Bag assembly 272 and chute 77 are suitably connected to the side wall of housing 52 as by support members 274 and 276 respectively.

An appropriate number of bags PB are disposed, open end up, on member 274 and urged in the direction away from housing 52 by a weak spring 278 connected between fixed wall 280 and movable wall 282. Since the bag PB has a slightly lower front face, finger 284 connected to chute 77 catches the higher rear face and keeps the one bag PB in position to receive sandwich S. An air tube 286 connected to a suitable source of air (not shown) is positioned, by member 288 which is connected to chute 77, to blow air against finger 284 and the rear face of bag PB thus urging the front face outwardly and opening bag PB. On the sandwich S sliding down chute 77 and being guided by retaining wall 88, it will enter bag PB.

As illustrated in FIGURE 2, bag PB is on a flap 78, which flap has a weak spring (not shown) to hold it in the horizontal position but as soon as any additional weight is placed on it such as sandwich S it will yield. Accordingly, when sandwich S is in bag PB its weight will cause flap 78 to yield and the sandwich filled bag PB will slide downwardly out of finger 284 onto conveyor belt 80. Another bag PB will then be advanced and held in position by finger 284 and opened by the action of air tube 286. Since the drop is short and bag PB is guided by retaining walls 88 and 88a it will remain with its open end up. Conveyor belt 80 carries bag PB to seal guides 290 which tend to bring the front and rear faces of bag PB together to facilitate its passing through and being sealed by heated rollers 82 as described hereinbefore. Bags PB are of suitable material which when heated will adhere to itself.

Conveyor belts 72 and 80 are suitably connected to a source of power (not shown) which enables them to rotate so that they will operate endlessly according to a well known principle in the art which, not forming part of the present invention, will not be repeated herein. Furthermore, rollers 82 have suitable electric heating means (not shown).

It will be understood that various changes in the details, materials and arrangements of parts which have been herein described and illustrated in order to explain the nature of the invention may be made by those skilled in the art within the principles and scope of the invention as expressed in the claim.

What is claimed is:

A machine for making ice cream sandwiches, which have protective bands, comprising:
 (a) a housing;
 (b) a turret having a plurality of pockets therein and connected to a shaft extending from the housing for intermittent rotation thereof;
 (c) a plurality of socket means having an opening in the bottom thereof and disposed in the pockets, one socket means in each pocket with each of said socket means adapted to receive a protective band and wafer for retention therein;
 (d) an ice cream charging means connected to the housing and disposed above the turret whereby ice cream may be discharged therefrom onto the wafer within the socket means so that thereafter a second wafer may be disposed thereon;
 (e) a compactor means, having a yieldable linkage, connected to the housing and disposed above the turret;
 (f) a compactor plate means formed at the end of the compactor means adjacent the turret, and adapted to engage the second wafer and urge it in the direction of the first wafer so that the ice cream will be uniformly forced against the protective band and adhere thereto to form said ice cream sandwich;
 (g) an ejector means connected to the housing including:
  (1) a raising means disposed normally below the socket means and adapted to extend through the opening of the socket means to raise said ice cream sandwich out of the socket means, and
  (2) a pushing means disposed above the turret to push the raised ice cream sandwich in a direction away from the turret whereby said sandwich may be disposed for shipping;
 (h) a power means connected to said shaft and each of said charging, compactor and ejector means and to intermittently operate the turret and to successively operate the ice cream charging means, the compactor means and the ejector means; and
 (i) the linkage of the compactor means adjacent the plate means formed to yield on the compactor means exerting over a predetermined amount of pressure so that on compaction of the sandwich, the wafers thereof will not be broken.

References Cited by the Examiner
UNITED STATES PATENTS

| | | | |
|---|---|---|---|
| 773,733 | 11/04 | Greene | 174—153 |
| 2,347,162 | 4/44 | Watts | 99—137 XR |
| 2,627,472 | 2/53 | Valenta | 99—180 |
| 2,630,389 | 3/53 | Lipshutz | 99—180 |
| 2,642,822 | 6/53 | Gentry | 107—54 |
| 2,715,878 | 8/55 | Egerton | 107—1 |
| 2,721,015 | 10/55 | Canales | 53—189 |
| 2,760,701 | 8/56 | Phelps | 58—189 XR |
| 2,794,404 | 6/57 | Rapp | 107—1 |
| 2,832,181 | 4/58 | Engleson et al. | 53—176 |
| 2,842,921 | 7/58 | Rasmusson | 53—189 |
| 2,875,708 | 3/59 | Hensgen | 107—1 |
| 2,934,872 | 5/60 | Wise | 99—180 XR |
| 3,113,530 | 12/63 | Vestermark | 107—1 |

ROBERT E. PULFREY, *Primary Examiner.*

A. LOUIS MONACELL, CHARLES A. WILLMUTH,
*Examiners.*